United States Patent
Bei et al.

(10) Patent No.: US 12,105,366 B2
(45) Date of Patent: Oct. 1, 2024

(54) PREPARATION METHOD OF DISPLAY MODULE, DISPLAY MODULE, AND ELECTRONIC DEVICE

(71) Applicant: VIVO MOBILE COMMUNICATION CO., LTD., Dongguan (CN)

(72) Inventors: Liangliang Bei, Dongguan (CN); Xiang Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/842,702

(22) Filed: Jun. 16, 2022

(65) Prior Publication Data

US 2022/0317503 A1    Oct. 6, 2022

Related U.S. Application Data

(63) Continuation of application No. PCT/CN2020/137430, filed on Dec. 18, 2020.

(30) Foreign Application Priority Data

Dec. 20, 2019 (CN) .......................... 201911328934.7

(51) Int. Cl.
G02F 1/1333 (2006.01)
(52) U.S. Cl.
CPC ...... *G02F 1/133302* (2021.01); *G02F 1/1333* (2013.01)
(58) Field of Classification Search
CPC ........... G02F 1/133302; G02F 1/13312; G02F 1/1333; H04N 23/57
See application file for complete search history.

(56) References Cited

U.S. PATENT DOCUMENTS 10,866,464 B2 *  12/2020  Ma ....................... G02F 1/13318
11,036,102 B1 *   6/2021  Xiong ................. G02F 1/13338
(Continued)

FOREIGN PATENT DOCUMENTS

CN    101118333 A    2/2008
CN    101960362 A    1/2011
(Continued)

OTHER PUBLICATIONS

International Search Report issued in corresponding International Application No. PCT/CN2020/137430, mailed Feb. 25, 2021, 6 pages.
(Continued)

*Primary Examiner* — Jia X Pan
(74) *Attorney, Agent, or Firm* — IPX PLLC

(57) ABSTRACT

A display module preparation method, a display module, and an electronic device are provided. The display module preparation method includes: preparing a first substrate; preparing a second substrate; bonding the first substrate and the second substrate; removing a partial structure of one side of the first substrate away from the second substrate, so that a surface of one side of the first substrate away from the second substrate is a plane; and removing a partial structure of one side of the second substrate away from the first substrate, so that a surface of one side of the second substrate away from the first substrate is a plane.

9 Claims, 1 Drawing Sheet

(56) References Cited

U.S. PATENT DOCUMENTS

| | | | | |
|---|---|---|---|---|
| 2006/0152638 A1* | 7/2006 | Choi | ............... | G11B 7/1369 |
| | | | | 349/2 |
| 2008/0023438 A1* | 1/2008 | Nishino | ............... | G02F 1/1333 |
| | | | | 216/23 |
| 2012/0206669 A1* | 8/2012 | Kim | ............... | G02F 1/133308 |
| | | | | 349/153 |
| 2018/0164626 A1* | 6/2018 | Fan | ............... | G02F 1/1341 |
| 2022/0229323 A1* | 7/2022 | Lin | ............... | G02F 1/13394 |

FOREIGN PATENT DOCUMENTS

| | | | | | |
|---|---|---|---|---|---|
| CN | 102778771 A | | 11/2012 | | |
| CN | 104460095 A | | 3/2015 | | |
| CN | 104678666 A | | 6/2015 | | |
| CN | 105607327 A | | 5/2016 | | |
| CN | 107817621 A | | 3/2018 | | |
| CN | 107946341 A | | 4/2018 | | |
| CN | 108227257 A | | 6/2018 | | |
| CN | 109164648 A | * | 1/2019 | ....... | G02F 1/133502 |
| CN | 109407375 A | | 3/2019 | | |
| CN | 110275340 A | | 9/2019 | | |
| CN | 110426885 A | | 11/2019 | | |
| CN | 110579911 A | | 12/2019 | | |
| CN | 111142284 A | | 5/2020 | | |
| CN | 111929936 A | * | 11/2020 | ........... | G02F 1/1333 |
| JP | 2017021201 A | | 1/2017 | | |
| WO | WO-2021068714 A1 | * | 4/2021 | ....... | G02F 1/133331 |

OTHER PUBLICATIONS

First Office Action issued in related Chinese Application No. 201911328934.7, mailed Mar. 3, 2021, 6 pages.

Second Office Action issued in related Chinese Application No. 201911328934.7, mailed Oct. 1 3, 2021, 5 pages.

Extended European Search Report issued in related European Application No. 20901500.7, mailed May 11, 2023, 9 pages.

\* cited by examiner

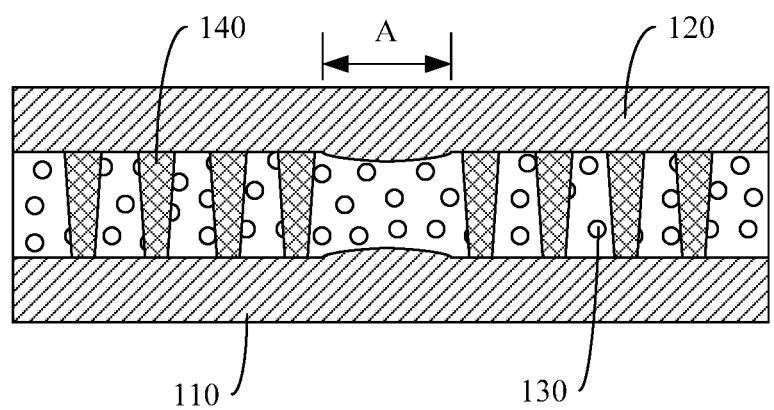

PREPARATION METHOD OF DISPLAY MODULE, DISPLAY MODULE, AND ELECTRONIC DEVICE

CROSS-REFERENCE TO RELATED APPLICATIONS

This application is a continuation of International Application No. PCT/CN2020/137430, filed Dec. 18, 2020, which claims priority to Chinese Patent 201911328934.7, filed in China on Dec. 20, 2019. The entire contents of each of the above-referenced applications are expressly incorporated herein by reference.

TECHNICAL FIELD

The present disclosure relates to the technical field of display, and in particular, to a display module preparation method, the display module, and an electronic device.

BACKGROUND

With the progress of technologies and the development of electronic devices, users have greater demand for all screen display electronic devices. Therefore, an all screen has gradually become a development trend.

Installation positions of cameras, sensors, light supplement lamps and other components are main factors that restrict the development of the all screen. In order to increase the screen-to-body ratio of the electronic device, a light-transmitting area may be arranged on the display module of the electronic device, and the camera and other optical devices are arranged facing towards the light-transmitting area, so that the functions of the optical devices are realized.

Specifically, the display module may include a first substrate and a second substrate which are stacked. In order to not affect the light transmittance of the light-transmitting area, other structures are not arranged between parts of the first substrate and the second substrate located in the light-transmitting area as far as possible. Under the action of atmospheric pressure, the parts of the first substrate and the second substrate located in the light-transmitting area are prone to concave deformation, so that the optical performance of the light-transmitting area is affected, resulting in poor performance of the optical devices.

SUMMARY

The present disclosure discloses a display module preparation method, the display module, and an electronic device.

The present disclosure adopts the following technical solutions:

A display module preparation method includes:
preparing a first substrate;
preparing a second substrate;
bonding the first substrate and the second substrate;
removing a partial structure of one side of the first substrate away from the second substrate, so that a surface of one side of the first substrate away from the second substrate is a plane; and
removing a partial structure of one side of the second substrate away from the first substrate, so that a surface of one side of the second substrate away from the first substrate is a plane.

A display module is prepared by the display module preparation method, the display module has a light-transmitting area, a surface of one side of the first substrate away from the second substrate is a plane, and a surface of one side of the second substrate away from the first substrate is a plane.

An electronic device includes the display module, and further includes an optical device, wherein the optical device and the second substrate are located on two sides of the first substrate respectively, and the light-transmitting area and the optical device are arranged oppositely.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings:

FIG. 1 is a structural schematic diagram of a display module according to an embodiment of the present disclosure.

DETAILED DESCRIPTION

To make the objectives, technical solutions and advantages of the present disclosure clearer, the technical solutions of the present disclosure are described clearly below with reference to the specific embodiments of the present disclosure and the corresponding accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The technical solutions disclosed by various embodiments of the present disclosure are described in detail below with reference to the accompanying drawings.

The embodiments of the present disclosure disclose a display module preparation method. The display module preparation method is used to prepare the display module shown in FIG. 1. The display module may be applied to an electronic device with an optical device. The display module has a light-transmitting area A, the light-transmitting area A has high light transmittance, and the optical device of the electronic device may be arranged towards the light-transmitting area A, so that light in the external environment may enter the optical device through the light-transmitting area A, or light emitted by the optical device may enter the external environment through the light-transmitting area A. In some embodiments, a shape of the light-transmitting area A may be designed according to the structure of the optical device. For example, the light-transmitting area A may be a circular area, the other area of the display module may be mainly used for displaying, and this area may surround the light-transmitting area A.

The display module preparation method disclosed by the embodiments of the present disclosure may include:
S100: preparing a first substrate 110;
S200: preparing a second substrate 120; and
S300: bonding the first substrate 110 and second substrate 120.

At this time, the first substrate 110 and the second substrate 120 are stacked. In some embodiments, the first substrate 110 and the second substrate 120 may adopt glass plates with high light transmittance. A thin film transistor is arranged on one surface of the first substrate 110 facing towards the second substrate 120. A plurality of thin film transistors may be provided, the thin film transistors are arranged on the first substrate 110 in an array, and the thin film transistors may drive the display module.

S400; removing a partial structure of one side of the first substrate 110 away from the second substrate 120, so that a surface of one side of the first substrate 110 away from the second substrate 120 is a plane.

When a part of the first substrate 110 located in the light-transmitting area A is concave, one surface of the first substrate 110 away from the second substrate 120 will be concave. At this time, after the operation of removing the partial structure from the first substrate 110, the surface of one side of the first substrate 110 away from the second substrate 120 is integrally changed into a plane, so that the influence on the optical performance of the light-transmitting area A by the concave surface is basically eliminated.

S500; removing a partial structure of the second substrate 120 away from the first substrate 110, so that a surface of one side of the second substrate 120 away from the first substrate 110 is plane.

When a part of the second substrate 120 located in the light-transmitting area A is concave, one surface of the second substrate 120 away from the first substrate 110 will be concave. At this time, after the operation of removing the partial structure from the second substrate 120, the surface of one side of the second substrate 120 away from the first substrate 110 is integrally changed into a plane, so that the influence on the optical performance of the light-transmitting area A by the concave surface is basically eliminated.

In the display module preparation method disclosed by the embodiments of the present disclosure, after the first substrate 110 and the second substrate 120 are bonded, the partial structure of one side of the first substrate 110 away from the second substrate 120 can be removed, so that the surface of one side of the first substrate 110 away from the second substrate 120 is a plane; meanwhile, the partial structure of one side of the second substrate 120 away from the first substrate 110 is removed, so that the surface of one side of the second substrate 120 away from the first substrate 110 is a plane; therefore, by the display module preparation method, the concave deformation of the parts of the first substrate 110 and the second substrate 120 located in the light-transmitting area A can be relieved, so that the optical performance of the light-transmitting area A and the performance of the optical device are improved.

In some embodiments, the step S400 of removing the partial structure of one side of the first substrate 110 away from the second substrate 120 specifically includes: removing the partial structure of one side of the first substrate 110 away from the second substrate 120 by a polishing process.

The processing precision of the polishing process is relatively high, so after the partial structure of the first substrate 110 is removed by the polishing process, the flatness of the surface of one side of the first substrate 110 away from the second substrate 120 is further improved, and the optical performance of the light-transmitting area A is better. Certainly, the partial structure of one side of the first substrate 110 away from the second substrate 120 may also be removed by a cutting process, which will not be limited in the embodiments of the present disclosure.

Further, before removing the partial structure of one side of the first substrate 110 away from the second substrate 120 by the polishing process, the method further includes: performing etching operation on the first substrate 110.

As mentioned above, the processing precision of the polishing process is high. In a case that the thickness of a to-be-removed part on the first substrate 110 is large, the cost of the polishing process will be increased, resulting in a relatively high forming process of the display module. The processing precision of the etching operation is relatively lower, so the operation cost is lower and the partial structure of the first substrate 110 can be removed. Therefore, the etching operation is performed before the polishing process, and the thickness of the part of the first substrate 110 removed by the polishing process can be effectively reduced, so that the polishing process can be performed at a lower cost.

In some embodiments, the step S500 of removing the partial structure of one side of the second substrate 120 away from the first substrate 110 specifically includes: removing the partial structure of one side of the second substrate 120 away from the first substrate 110 by a polishing process.

The processing precision of the polishing process is relatively high, so after the partial structure of the second substrate 120 is removed by the polishing process, the flatness of the surface of one side of the second substrate 120 away from the first substrate 110 is further improved, and the optical performance of the light-transmitting area A is better. Certainly, the partial structure of one side of the second substrate 120 away from the first substrate 110 may also be removed by a cutting process, which will not be limited in the embodiments of the present disclosure.

Further, before removing the partial structure of one side of the second substrate 120 away from the first substrate 110 by the polishing process, the method further includes: performing etching operation on the second substrate 120.

As mentioned above, the processing precision of the polishing process is high. In a case that the thickness of a to-be-removed part on the second substrate 120 is large, the cost of the polishing process will be increased, resulting in a relatively high forming process of the display module. The processing precision of the etching operation is relatively lower, so the operation cost is lower and the partial structure of the second substrate 120 can be removed. Therefore, the etching operation is performed before the polishing process, and the thickness of the part of the second substrate 120 removed by the polishing process can be effectively reduced, so that the polishing process can be performed at a lower cost.

It can be seen from the above that after the partial structure of one side of the first substrate 110 away from the second substrate 120 and the partial structure of one side of the second substrate 120 away from the first substrate 110 are removed, the influence on the optical performance of the light-transmitting area A by the concave deformation of the first substrate 110 and the second substrate 120 can be eliminated. In a case that the thickness of the removed parts of the first substrate 110 and the second substrate 120 is too small, the concave deformation of the first substrate 110 and the second substrate 120 may not be eliminated. In a case that the thickness of the removed parts of the first substrate 110 and the second substrate 120 is too large, the structural strength of the first substrate 110 and the second substrate 120 is too low, which easily leads to low structural strength of the display module. Based on this, in the step of removing the partial structure of one side of the first substrate 110 away from the second substrate 120, the thickness of the removed partial structure is 5~20 μm, so that the thickness of the removed part of the first substrate 110 is moderate, the concave deformation of the first substrate 110 can be eliminated well, and the structural strength of the first substrate 110 can be ensured.

Similarly, only the thickness of the removed part of the second substrate 120 may also be optimized. Specifically, a thickness of the partial structure that is removed from one side of the second substrate 120 away from the first substrate 110 is 5~20 μm, so that the thickness of the removed part of the second substrate 120 is moderate, the concave deformation of the second substrate 120 can be eliminated well, and the structural strength of the second substrate 120 can be ensured. Certainly, the thickness of the removed parts of the first substrate 110 and the second substrate 120 may also be optimized at the same time, that is, a thickness of the partial structure that is removed from one side of the first substrate 110 away from the second substrate 120 is 5~20 μm; meanwhile, in the step of removing the partial structure of one side of the second substrate 120 away from the first substrate 110, the thickness of the removed partial structure is 5~20 μm.

Based on the display module preparation method provided by any of the above embodiments, the embodiments of the present disclosure further disclose display module. The display module is prepared by the display module preparation method provided by any of the embodiments. The display module has a light-transmitting area A, the first substrate 110 and the second substrate 120 are stacked, the surface of one side of the first substrate 110 away from the second substrate 120 is a plane, and the surface of one side of the second substrate 120 away from the first substrate 110 is a plane, so that the concave deformation of the parts of the first substrate 110 and the second substrate 120 located in the light-transmitting area A can be relieved, and the optical performance of the light-transmitting area A and the performance of the optical device are improved.

In some embodiments, the display module may be a liquid crystal display module. At this time, the display module further includes a liquid crystal layer 130, and the liquid crystal layer 130 is arranged between the first substrate 110 and the second substrate 120. Certainly, the display module may also be an organic light-emitting display module. At this time, the display module further includes an organic light-emitting layer. The organic light-emitting layer is arranged between the first substrate 110 and the second substrate 120. Relatively speaking, in a case that the display module is an organic light-emitting display module, the operation of removing the partial structure of one side of the second substrate 120 away from the first substrate 110 may affect a touch structure arranged on the second substrate 120; therefore, the above solutions are more suitable for the liquid crystal display module.

In some embodiments, the first substrate 110, the second substrate 120 and the liquid crystal layer 130 have the same refractive index. When light is transmitted among the first substrate 110, the second substrate 120 and the liquid crystal layer 130, even if convex structures are generated on one surface of the first substrate 110 facing towards the liquid crystal layer 130 and one surface of the second substrate 120 facing towards the liquid crystal layer 130 due to concave deformation, and the first substrate 110, the second substrate 120 and the liquid crystal layer 130 may also be regarded as an integral structure, so that during light propagation, there will be basically no excessive directional changes. Therefore, this arrangement can improve the optical performance of the light-transmitting area A, and the performance of the optical device is better. In some embodiments, the refractive indexes of the first substrate 110, the second substrate 120 and the liquid crystal layer 130 may be set to about 1.5.

Since the sizes of the first substrate 110 and the second substrate 120 are usually large, the first substrate 110 and the second substrate 120 are liable to deform at the light-transmitting area A and also have deformation possibility in other areas. Based on this, the display module may further include a plurality of supporting columns 140, each supporting column 140 is arranged between the first substrate 110 and the second substrate 120, and the supporting columns 140 are arranged at intervals. Each supporting column 140 may apply a supporting force to the first substrate 110 and the second substrate 120, so that the substrate 110 and the second substrate 120 are not liable to deform.

Based on the display module provided by any of the above embodiments, the embodiments of the present disclosure further discloses an electronic device. The electronic device includes the display module provided by any of the above embodiments, and further includes an optical device, wherein the optical device and the second substrate 120 are located on two sides of the first substrate 110 respectively, and the light-transmitting area A of the display module and the optical device are arranged oppositely.

In some embodiments, the optical device includes at least one of a fingerprint module, a camera, a sensor and a light supplement lamp, so that the corresponding fingerprint recognition, shooting, data detection and light supplement functions can be realized; and these optical devices may not occupy the display area of the electronic device, so that the screen-to-body ratio of the electronic device is higher. Certainly, the optical device may further include other devices with light receiving function or light emitting function, which will not be limited in the embodiments of the present disclosure.

The electronic device disclosed in the embodiments of the present disclosure may be a smart phone, a tablet computer, an e-book reader, or a wearable device. Certainly, the electronic device may also be other devices, which is not limited in the embodiments of the present disclosure.

The embodiments of the present disclosure focus on describing differences between the embodiments, and different optimization features of the embodiments may be combined to form better embodiments provided that they are not contradictory. Considering brevity, details are not described herein again.

The above is only embodiments of the present disclosure, and is not intended to limit the present disclosure. Various changes and modifications may be made to the present disclosure by those skilled in the art. Any modifications, equivalent substitutions, improvements and the like made within the spirit and principle of the present disclosure should be included within the scope of the claims of the present disclosure.

The invention claimed is:

1. A display module preparation method, comprising:
    preparing a first substrate;
    preparing a second substrate;
    arranging a liquid crystal layer between the first substrate and the second substrate and bonding the first substrate and the second substrate;
    when a part of the first substrate located in a light-transmitting area is concave to form a convex portion that faces the second substrate, removing a partial structure of one side of the first substrate away from the second substrate, so that a surface of one side of the first substrate away from the second substrate is a plane; and when a part of the second substrate located within the light-transmitting area is concave to form a convex portion that faces the first substrate, removing a partial structure of one side of the second substrate away from the first substrate, so that a surface of one side of the second substrate away from the first substrate is a plane, wherein both convex portions are aligned with each other and overlap an entire area of the light-transmitting area, wherein the first substrate, the liquid crystal layer, and the second substrate have the same refractive index such that light propagation through the first substrate, the liquid crystal layer, and the second substrate has no excessive directional changes at the convex portions.

2. The display module preparation method according to claim 1, wherein removing the partial structure of one side of the first substrate away from the second substrate comprises:

removing the partial structure of one side of the first substrate away from the second substrate by a polishing process.

3. The display module preparation method according to claim 2, wherein before removing the partial structure of one side of the first substrate away from the second substrate, the display module preparation method comprises:

performing etching operation on the first substrate.

4. The display module preparation method according to claim 1, wherein removing the partial structure of one side of the second substrate away from the first substrate comprises:

removing the partial structure of one side of the second substrate away from the first substrate by a polishing process.

5. The display module preparation method according to claim 4, wherein before removing the partial structure of one side of the second substrate away from the first substrate, the display module preparation method comprises:

performing etching operation on the second substrate.

6. The display module preparation method according to claim 1, wherein:

a thickness of the partial structure that is removed from one side of the first substrate away from the second substrate is 5~20 μm; or a thickness of the partial structure that is removed from one side of the second substrate away from the first substrate is 5~20 μm.

7. A display module, comprising:

a first and second substrates, wherein the first and second substrates are bonded;

a liquid crystal layer, wherein the liquid crystal layer is arranged between the first substrate and the second substrate; and a light-transmitting area, wherein:

a surface of one side of the first substrate away from the second substrate is a plane, and a part of the first substrate located within the light-transmitting area forms a convex portion that faces the second substrate;

a surface of one side of the second substrate away from the first substrate is a plane, and a part of the second substrate located within the light-transmitting area forms a convex portion that faces the first substrate;

both convex portions are aligned with each other and overlap an entire area of the light-transmitting area; and the first substrate, the liquid crystal layer, and the second substrate have the same refractive index such that light propagation through the first substrate, the liquid crystal layer, and the second substrate has no excessive directional changes at the convex portions.

8. An electronic device, comprising a display module and an optical device, wherein:

the optical device and a second substrate are located on two sides of a first substrate respectively, a liquid crystal layer, wherein the liquid crystal layer is arranged between the first substrate and the second substrate, a light-transmitting area and the optical device are arranged oppositely, a surface of one side of the first substrate away from the second substrate is a plane, and a part of the first substrate located within the light-transmitting area forms a convex portion that faces the second substrate, a surface of one side of the second substrate away from the first substrate is a plane, and a part of the second substrate located within the light-transmitting area forms a convex portion that faces the first substrate, both convex portions are aligned with each other and overlap an entire area of the light-transmitting area, and the first substrate, the liquid crystal layer, and the second substrate have the same refractive index such that light propagation through the first substrate, the liquid crystal layer, and the second substrate has no excessive directional changes at the convex portions.

9. The electronic device according to claim 8, wherein the optical device comprises at least one of a fingerprint module, a camera, a sensor, or a light supplement lamp.

* * * * *